US012716008B2

(12) United States Patent
Kim et al.

(10) Patent No.: US 12,716,008 B2
(45) Date of Patent: Aug. 25, 2026

(54) SOLVENT-FREE COATING COMPOSITION

(71) Applicant: PPG SSC Co., Ltd., Ulsan (KR)

(72) Inventors: Je Hyuk Kim, Ulsan (KR); Hong Chul Moon, Ulsan (KR); Hyun Jik Lee, Ulsan (KR)

(73) Assignee: PPG SSC CO., LTD, Ulsan (KR)

( * ) Notice: Subject to any disclaimer, the term of this patent is extended or adjusted under 35 U.S.C. 154(b) by 644 days.

(21) Appl. No.: 18/042,110

(22) PCT Filed: Aug. 6, 2021

(86) PCT No.: PCT/KR2021/010422
§ 371 (c)(1),
(2) Date: Feb. 17, 2023

(87) PCT Pub. No.: WO2022/039422
PCT Pub. Date: Feb. 24, 2022

(65) Prior Publication Data

US 2023/0242786 A1 Aug. 3, 2023

(30) Foreign Application Priority Data

Aug. 20, 2020 (KR) ........................ 10-2020-0104766

(51) Int. Cl.
*C09D 5/02* (2006.01)
*C08G 59/50* (2006.01)
(Continued)

(52) U.S. Cl.
CPC ....... *C09D 163/00* (2013.01); *C08G 59/5006* (2013.01); *C09D 5/028* (2013.01);
(Continued)

(58) Field of Classification Search
CPC ... C09D 5/08; C09D 7/61; C09D 7/65; C09D 163/00; C08L 63/00; C08K 5/06; C08K 5/5435
See application file for complete search history.

(56) References Cited

U.S. PATENT DOCUMENTS

2007/0224362 A1 9/2007 Briand et al.
2015/0232998 A1* 8/2015 Colominas Tutusaus .................. C09D 7/48 428/313.9

(Continued)

FOREIGN PATENT DOCUMENTS

CN 109689724 A 4/2019
EP 1788048 A1 5/2007

(Continued)

OTHER PUBLICATIONS

Jun. 5, 2020Machine translation of Lim (KR2020/0063571), publication date Jun. 5, 2020.*

(Continued)

*Primary Examiner* — Jun Li

(57) ABSTRACT

The present invention relates to a coating composition which is an anticorrosive paint for ship structures and can be coated by a regular airless painting machine, and is solvent-free or contains a low solvent content. The coating composition according to an embodiment of the present invention may exhibit excellent pot life, atomization and drying time, and is eco-friendly due to having a high solid content and thus lower VOC emissions.

21 Claims, 2 Drawing Sheets

Embodiment 1

Comparative Example 1

Comparative Example 2

Comparative Example 3

Comparative Example 4

(51) Int. Cl.

| | |
|---|---|
| ***C09D 7/20*** | (2018.01) |
| ***C09D 7/45*** | (2018.01) |
| ***C09D 7/63*** | (2018.01) |
| ***C09D 163/00*** | (2006.01) |

(52) U.S. Cl.

CPC ................. *C09D 7/20* (2018.01); *C09D 7/45* (2018.01); *C09D 7/63* (2018.01)

(56) References Cited

U.S. PATENT DOCUMENTS

| | | | | |
|---|---|---|---|---|
| 2016/0200916 | A1* | 7/2016 | Nishiguchi | C09D 163/00 252/396 |
| 2018/0327629 | A1* | 11/2018 | Tomura | C08G 59/5026 |
| 2019/0382591 | A1* | 12/2019 | Jung | C09D 5/08 |
| 2020/0123311 | A1* | 4/2020 | Teichert | C08G 59/5026 |
| 2020/0354604 | A1* | 11/2020 | Grötzinger | C09D 163/00 |

FOREIGN PATENT DOCUMENTS

| | | | | |
|---|---|---|---|---|
| JP | 0649392 | A | | 2/1994 |
| JP | 10211464 | A | | 8/1998 |
| JP | 2000232204 | A | | 8/2000 |
| JP | 2001146566 | A | * | 5/2001 |
| JP | 2014101629 | A | * | 6/2014 |
| JP | 2016055214 | A | * | 4/2016 |
| KR | 20080059302 | A | | 6/2008 |
| KR | 20130042706 | A | | 4/2013 |
| KR | 20190067168 | A | | 6/2019 |
| KR | 20200063571 | A | | 6/2020 |
| WO | 2018046702 | A1 | | 3/2018 |

OTHER PUBLICATIONS

International Search Report and Written Opinion received for PCT Application Serial No. PCT/KR2021/010422 dated Dec. 1, 2021, 10 pages.

* cited by examiner

[FIG. 1]
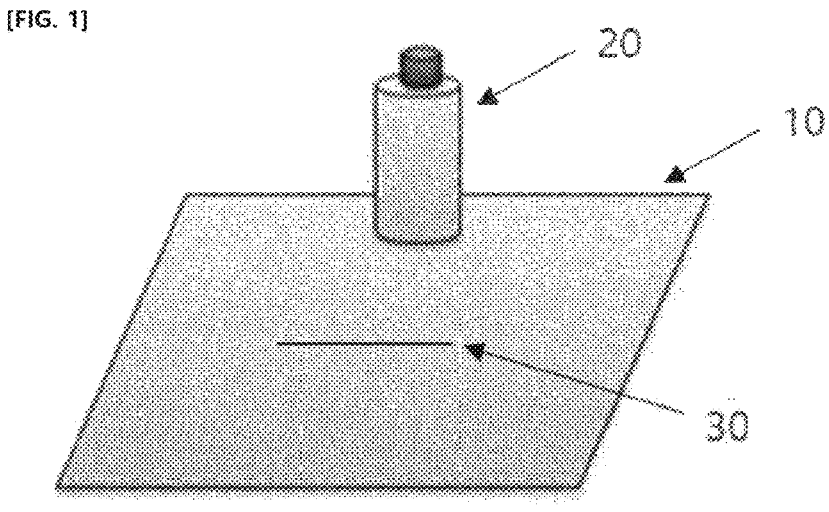
[FIG. 2]
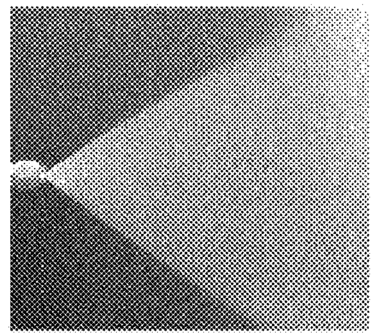
Embodiment 1
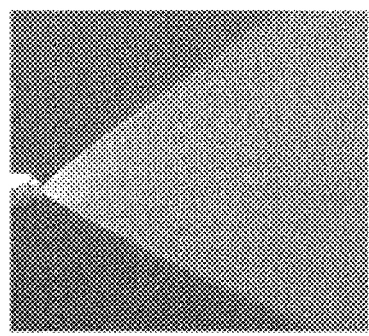
Comparative Example 1
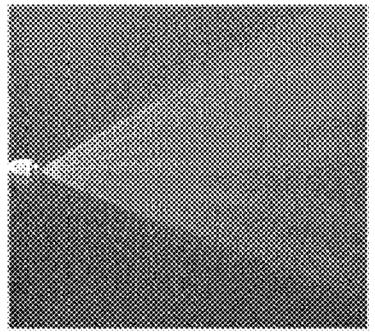
Comparative Example 2
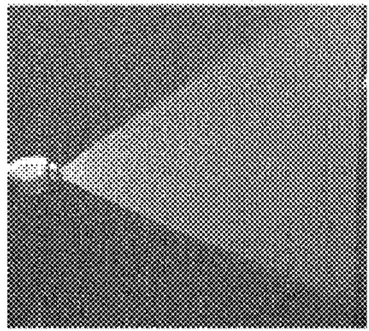
Comparative Example 3
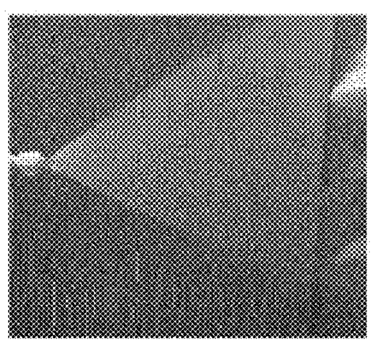
Comparative Example 4

[FIG. 3]
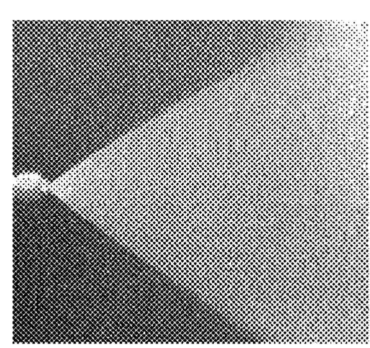
Embodiment 1
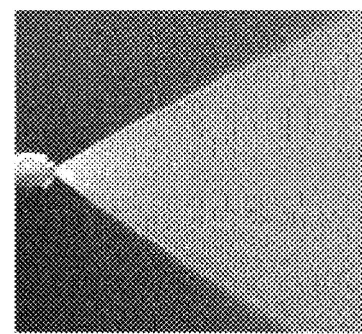
Embodiment 2
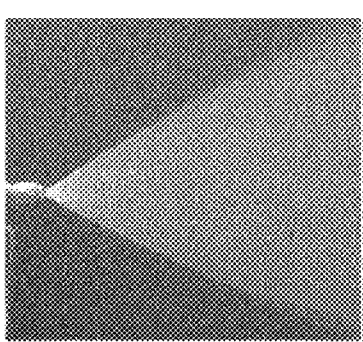
Embodiment 3
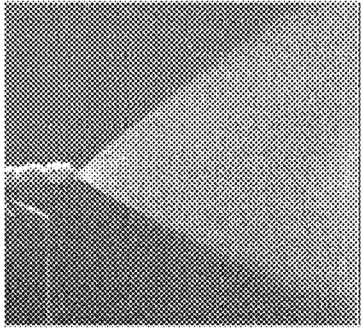
Embodiment 4
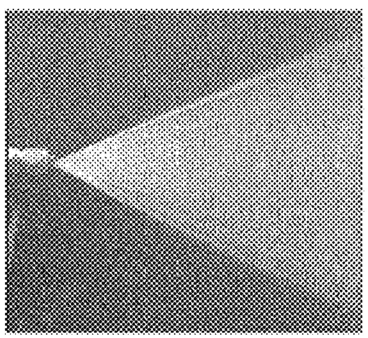
Comparative Example 5

SOLVENT-FREE COATING COMPOSITION

TECHNICAL FIELD

The present invention relates to a coating composition containing no solvent or low solvent content. In particular, the present invention relates to a primer coating composition that, as a paint for the prevention of rust on ship structures, it can be coated by a conventional airless coating machine and contains no solvent or a low content of solvent.

BACKGROUND ART

Generally, ships are composed of parts such as a ship bottom, boot topping, outside board, exposed deck, void space, cofferdam, engine room, cargo hold, cargo tank, water ballast tank, and the like. Each part is manufactured as an individual block so that it can be painted, and assembled after painting.

In the process of building such a ship, a universal primer with excellent anti-rust property and excellent adhesion to various finishing paints is applied as a single primer to all pre-treated blocks to simplify the process and minimize waste.

A known universal primer comprises an epoxy resin, a vinyl chloride-based copolymer and a curing agent as basic components (see Japanese Unexamined Patent Application Publication No. 1998-211464). However, since this coating composition uses a solid epoxy resin and a solid amine-based curing agent, a large amount of solvent is required. Specifically, this coating composition contains about 60% by weight of solids and about 40% by weight of solvent. When this coating composition is applied as a single primer to the entire block and its painted area as a general-purpose primer, the total amount of solvent increases and a large amount of volatile organic compounds (VOC) is discharged, which is undesirable in terms of worker health and environment.

As a high-solids epoxy-based anti-corrosion paint to solve this problem, an anticorrosive coating composition using a bisphenol A type liquid epoxy resin and an amine curing agent such as aliphatic polyamine, aromatic polyamine, or polyamide alone or in combination has been developed (see Japanese Unexamined Patent Application Publication No. 2002-80563). This coating composition is composed of about 80% by weight of solid content and about 20% by weight of solvent.

On the other hand, with the trend of strengthening VOC emission regulations (regulations on the total amount of solvents), ultra-high solids primers with a further reduced solvent content are required for safety, economics, and environmental reasons.

In this regard, a paint composition having a solid content of close to 100% by weight is disclosed in European Patent Application Publication No. 1788048; however, the paint compositions in the embodiments are difficult to use under general painting conditions with a conventional airless coating machine due to their short pot life and high viscosity.

In addition, Korean Unexamined Patent Application Publication No. 10-2019-0067168 discloses a coating composition with a high solid content using a bisphenol F epoxy resin as a main component; however, the pot life is relatively short, and rust prevention and repaintability need improvement.

DETAILED DESCRIPTION OF THE INVENTION

Problem to be Solved by the Invention

Accordingly, an object of the present invention is to provide a coating composition having a low VOC value, low viscosity, and sufficient pot life, so that it can be applied with a conventional airless sprayer, and has excellent workability and film properties.

Means for Solving the Problem

According to one embodiment of the present invention for achieving the above object, a coating composition is provided, wherein, as a two-component coating composition comprising a first liquid and a second liquid, the first liquid comprises (A) an epoxy resin comprising (A1) a bisphenol A epoxy resin and (A2) a hydrogenated bisphenol A epoxy resin; (B) a reactive diluent; and (C) a silane compound; and the second liquid comprises (D) an amine-based curing agent; the coating composition has a solids content of 90% or more by weight when measured according to ASTM D5201-05; has a viscosity of 60 to 110 KU (Krebs) when measured according to ASTM D562-10 at a temperature of 23° C. and a relative humidity of 50%; the ratio of the active hydrogen equivalent in the curing agent to the epoxy equivalent in the first liquid ranges from 50:100) to 100:100; and the weight ratio of bisphenol A epoxy resin (A1) to hydrogenated bisphenol A epoxy resin (A2) ranges from 60:40 to 25:75.

In one embodiment of the present invention, the coating composition comprises 5 to 35% by weight of a bisphenol A epoxy resin (A1), 5 to 65% by weight of a hydrogenated bisphenol A epoxy resin (A2), 2.5 to 20% by weight of a reactive diluent (B) and 2.5 to 30% by weight of a silane compound (C), based on the total weight of the composition.

In one embodiment of the present invention, the coating composition may further comprise (E) (E1) 0.1 to 25% by weight of a color pigment and (E2) 25 to 60% by weight of an extender pigment, based on the total weight of the composition.

In one embodiment of the present invention, the coating composition may further comprise (F) 0.1 to 5% by weight of an anti-settling agent, based on the total weight of the composition.

In one embodiment of the present invention, the coating composition may further comprise (G) 4% by weight or less of a solvent, based on the total weight of the composition.

In one embodiment of the present invention, the epoxy equivalent weight (EEW) of the bisphenol A epoxy resin (A1) may range from 100 to 300 g/eq.

In one embodiment of the present invention, when measured according to ASTM D4285 at a temperature of 23° C. and a relative humidity of 50%, the viscosity of the bisphenol A epoxy resin (A1) may be 7,000 to 30,000 cP.

In one embodiment of the present invention, the epoxy equivalent of the hydrogenated bisphenol A epoxy resin (A2) may range from 100 to 300 g/eq.

In one embodiment of the present invention, when measured according to ASTM D4285 at a temperature of 23° C. and a relative humidity of 50%, the viscosity of the hydrogenated bisphenol A epoxy resin (A2) may be 1,000 to 7.000 cP.

In one embodiment of the present invention, the reactive diluent (B) may comprise 1,6-hexanediol diglycidyl ether or 1,4-butanediol diglycidyl ether.

In one embodiment of the present invention, the viscosity of the reactive diluent (B) may be 10 to 50 cP when measured according to ASTM D4285 at a temperature of 23° C. and a relative humidity of 50%.

In one embodiment of the present invention, the silane compound (C) may comprise 3-glycidoxypropyltrimethoxysilane.

In one embodiment of the present invention, the amine-based curing agent (D) may comprise a phenylamine or a polyamine curing agent.

In one embodiment of the present invention, the viscosity of the amine-based curing agent (D) may be 50 to 500 cP when measured according to ASTM D4285 at a temperature of 23° C. and a relative humidity of 50%.

In one embodiment of the present invention, the active hydrogen equivalent weight (AHEW) of the amine-based curing agent (D) may be in the range of 30 to 150 g/eq.

In one embodiment of the present invention, the color pigment (E1) may comprise at least one of titanium oxide, carbon black, lead white, graphite, zinc sulfide, zinc oxide, chromium oxide, yellow nickel titanium, yellow chrome titanium, yellow iron oxide, red iron oxide, black iron oxide, phthalocyanine blue, phthalocyanine green, ultramarine blue, benzimidazolone yellow, and quinacridone red and azo red/yellow pigments.

In one embodiment of the present invention, the extender pigment (E2) may comprise at least one of talc, clay, calcium carbonate, magnesium carbonate, barium sulfate, silicic acid, silicates, alumina, calcium sulfate, mica iron oxide (MIO), glass flakes and mica.

In one embodiment of the present invention, the anti-settling agent (F) may comprise at least one of polyamide wax, polyethylene wax, and bentonite-based thixotropic agent.

In one embodiment of the present invention, the solvent (G) may comprise at least one of toluene, xylene, isobutanol, methyl ethyl ketone, methyl isobutyl ketone, and benzyl alcohol.

According to one embodiment of the present invention for achieving the above object, a coating composition is provided, comprising (A) an epoxy resin comprising (A1) 5 to 25% by weight of a bisphenol A epoxy resin and (A2) 5 to 50% by weight of a hydrogenated bisphenol A epoxy resin, (B) 2.5-10% by weight of a reactive diluent, (C) 2.5 to 17% by weight of a silane compound, (D) an amine-based curing agent, (E) a pigment comprising (E1) 0.1 to 25% by weight of a color pigment and (E2) 25 to 60% by weight of an extender pigment, (F) 0.1-5% by weight of an anti-settling agent, and (G) 0-4% by weight of a solvent, based on the total weight of the composition; wherein the coating composition has a solids content of at least 90% by weight when measured according to ASTM D5201-05; has a viscosity of 60 to 110 KU (Krebs) when measured according to ASTM D562-10 at a temperature of 23° C. and a relative humidity of 50%; the ratios of active hydrogen equivalents in the curing agent to epoxy equivalents in the coating composition range from 50:100 to 100:100; and the weight ratio of the bisphenol A epoxy resin (A1) to the hydrogenated bisphenol A epoxy resin (A2) ranges from 60:40 to 25:75.

In one embodiment of the present invention, when measured according to ASTM D562, the coating composition may have a pot life of at least 1 hour, defined as the time it takes for the viscosity of the coating composition to increase by 50%; and when measured according to ASTM D5895, the drying time (based on the thickness of the coating film of 300 μm) at 25° C. may be 8 to 12 hours.

In one embodiment of the present invention, when measured according to ASTM D5201-05, the coating composition may have a VOC content of 100 g/liter or less.

According to another embodiment of the present invention, a coating film formed by curing the above coating composition and having a thickness of 100 to 500 μm is provided.

According to another embodiment of the present invention, a substrate coated with at least a portion of the above coating composition is provided.

In one embodiment of the present invention, the substrate may comprise at least one of steel, stainless steel, carbon steel, galvanized steel, shop primer steel and aluminum.

Effects of the Invention

The coating composition according to the embodiment of the present invention may exhibit excellent pot life, atomization (workability) and drying time when applied with an airless sprayer.

In addition, since the coating composition according to the embodiment of the present invention can exhibit excellent anti-corrosion and repainting properties, when applied to a ballast tank of a ship, maintenance work can be significantly reduced.

In addition, the coating composition according to the embodiment of the present invention is environmentally friendly because the solid content is very high and the VOC emission is small.

BRIEF DESCRIPTION OF THE DRAWINGS

FIG. 1 shows a state in which a zinc electrode is installed on a specimen for a rust resistance test.

FIG. 2 is a photograph taken in the spray state for the workability evaluation of Embodiment 1 and Comparative Examples 1 to 4.

FIG. 3 is a photograph taken in the spray state for the workability evaluation of Embodiments 1 to 4 and Comparative Example 5.

BEST MODE FOR CARRYING OUT THE INVENTION

Hereinafter, the present invention will be described in more detail.

The coating composition according to one embodiment of the present invention may be a two-component type including a first liquid and a second liquid. In order to prevent premature curing, the coating composition according to one embodiment of the present invention is supplied as a first liquid containing an epoxy resin, a reactive diluent and a silane compound and a second liquid containing an amine-based curing agent; the coating composition according to an embodiment of the present invention comprises a composition formed from a combination of a first liquid and a second liquid.

According to one embodiment of the present invention, a coating composition is provided, wherein as a two-component coating composition comprising a first liquid and a second liquid, the first liquid comprises (A) an epoxy resin comprising (A1) a bisphenol A epoxy resin and (A2) a hydrogenated bisphenol A epoxy resin; (B) a reactive diluent; and (C) a silane compound; and the second liquid comprises (D) an amine-based curing agent; the coating composition has a solids content of 90% or more by weight when measured according to ASTM D5201-05; has a viscosity of 60 to 110 KU (Krebs) when measured according to ASTM D562-10 at a temperature of 23° C. and a relative humidity of 50%; the ratio of the active hydrogen equivalent in the curing agent to the epoxy equivalent in the first liquid ranges from 50:100 to 100:100; and the weight ratio of bisphenol A epoxy resin (A1) to hydrogenated bisphenol A epoxy resin (A2) ranges from 60:40 to 25:75.

The coating composition may comprise 5 to 35% by weight of a bisphenol A epoxy resin (A1), 5 to 65% by weight of a hydrogenated bisphenol A epoxy resin (A2), 2.5 to 20% by weight of a reactive diluent (B) and 2.5 to 30% by weight of a silane compound (C), based on the total weight of the composition.

Main Components of the Coating Composition

Hereinafter, each component of the first liquid and the second liquid constituting the coating composition according to one embodiment of the present invention will be described in detail.

(A) Epoxy Resin

The first liquid of the coating composition according to an embodiment of the present invention comprises an epoxy resin (A) as one of the binder resin components. Specifically, the epoxy resin (A) comprises a bisphenol A epoxy resin (A1) and a hydrogenated bisphenol A epoxy resin (A2).

(A1) Bisphenol A Epoxy Resin

A "bisphenol A epoxy resin" generally refers to a resin prepared by polymerizing bisphenol A and epichlorohydrin. The bisphenol A epoxy resin has at least two epoxy groups and serves to improve the low-temperature curability and adhesion of the coating composition to a substrate such as a blast steel sheet.

In an embodiment of the present invention, the bisphenol A epoxy resin is preferably liquid at room temperature. When the bisphenol A epoxy resin is liquid at room temperature, it is preferable because it can lower the viscosity of the coating composition.

In an embodiment of the present invention, two or more liquid bisphenol A epoxy resins may be mixed and used.

In an embodiment of the present invention, the bisphenol A epoxy resin may have an epoxy equivalent weight (EEW) in the range of 100 to 300 g/eq. The epoxy equivalent of the bisphenol A epoxy resin may be preferably 150 to 250 g/eq., more preferably 170 to 200 g/eq.

In an embodiment of the present invention, the bisphenol A epoxy resin may have a weight average molecular weight of 300 to 600 g/mole. The weight average molecular weight of the bisphenol A epoxy resin may be preferably 300 to 500 g/mol, more preferably 300 to 400 g/mol.

In an embodiment of the present invention, the bisphenol A epoxy resin may have a viscosity of 7,000 to 30,000 cP when measured according to ASTM D4285 at a temperature of 23° C. and a relative humidity of 50%. The viscosity of the bisphenol A epoxy resin may be preferably 8.000 to 20.000 cP, more preferably 11.000 to 15.000 cP.

Representative liquid bisphenol A epoxy resins include Epicoat 828 (Hexion, epoxy equivalent 182-187 g/eq.), Araldite GY 250 (Huntsman, epoxy equivalent 180-189 g/eq.), D.E.R. 331 (Dow, epoxy equivalent 182 to 192 g/eq.) and the like, but are not particularly limited thereto.

In an embodiment of the present invention, the coating composition may comprise the bisphenol A epoxy resin (A1) in an amount of 5 to 35% by weight based on the total weight of the composition. The content of the bisphenol A epoxy resin (A1) in the coating composition is preferably 5 to 25% by weight, more preferably 8 to 25% by weight, most preferably 10 to 25% by weight, based on the total weight of the composition. can Since the viscosity of the bisphenol A epoxy resin (A1) is about 4 to 5 times higher than that of the hydrogenated bisphenol A epoxy resin (A2) described later, If the content of the bisphenol A epoxy resin (A1) exceeds 35% by weight based on the total weight of the composition, the viscosity of the coating composition may increase and workability may deteriorate. On the other hand, when the content of the bisphenol A epoxy resin (A1) is less than 5% by weight based on the total weight of the composition, the chemical resistance and water resistance of the coating composition may decrease and the drying time may increase.

Meanwhile, in one embodiment of the present invention, the weight ratio of the bisphenol A epoxy resin (A1) to the hydrogenated bisphenol A epoxy resin (A2) ranges from 60:40 to 25:75. Preferably, the weight ratio of the bisphenol A epoxy resin (A1) to the hydrogenated bisphenol A epoxy resin (A2) may be 60:40 to 30:70. More preferably, the weight ratio of the bisphenol A epoxy resin (A1) to the hydrogenated bisphenol A epoxy resin (A2) may be 55:45 to 40:60. When the weight ratio of the bisphenol A epoxy resin (A1) to the hydrogenated bisphenol A epoxy resin (A2) is within the above range, the coating composition can balance pot life and drying time while having suitable viscosity, chemical resistance and water resistance.

(A2) Hydrogenated Bisphenol a Epoxy Resin

Hydrogenated bisphenol A epoxy resin refers to resins in which carbon-carbon unsaturated bonds of aromatic rings present in bisphenol A epoxy resins are hydrogenated. Hydrogenated bisphenol A epoxy resin has at least two epoxy groups and dries relatively slowly while having low viscosity and does not have an aromatic ring in the molecule, so it serves to improve the flexibility and pot life of the coating film.

In an embodiment of the present invention, the hydrogenated bisphenol A epoxy resin is preferably liquid at room temperature. When the hydrogenated bisphenol A epoxy resin is liquid at room temperature, it is preferable because it can lower the viscosity of the coating composition.

In an embodiment of the present invention, two or more liquid hydrogenated bisphenol A epoxy resins may be mixed and used.

In an embodiment of the present invention, the hydrogenated bisphenol A epoxy resin may have an epoxy equivalent in the range of 100 to 300 g/eq. The epoxy equivalent of the hydrogenated bisphenol A epoxy resin may be preferably 150 to 250 g/eq., more preferably 200 to 250 g/eq.

In an embodiment of the present invention, the hydrogenated bisphenol A epoxy resin may have a viscosity of 1,000 to 7,000 cP when measured according to ASTM D4285 at a temperature of 23° C. and a relative humidity of 50%. The viscosity of the hydrogenated bisphenol A epoxy resin may be preferably 1,800 to 5,000 cP, more preferably 1,800 to 4,000 cP.

Representative liquid hydrogenated bisphenol A epoxy resins include EPONEX 1510 (Hexion, epoxy equivalent of 205 to 215 g/eq.), EP-4080E (ADEKA, epoxy equivalent of about 215 g/eq.), ST-3000 (Kukdo, Epoxy equivalent 220~240 g/eq.) and the like, but are not particularly limited thereto.

In an embodiment of the present invention, the coating composition comprises the hydrogenated bisphenol A epoxy resin (A2) in an amount of 5 to 65% by weight based on the total weight of the composition. The content of the hydrogenated bisphenol A epoxy resin (A2) in the coating composition may preferably be 5 to 50% by weight, more preferably 5 to 25% by weight, most preferably 10 to 25% by weight, based on the total weight of the composition. If the content of the hydrogenated bisphenol A epoxy resin (A2) exceeds 65% by weight based on the total weight of the composition, the chemical resistance and water resistance of the coating composition may deteriorate and the drying time may increase. On the other hand, when the content of the hydrogenated bisphenol A epoxy resin (A2) is less than 5% by weight based on the total weight of the composition, the viscosity of the coating composition may increase and workability may deteriorate.

(A3) Other Epoxy Resins

The coating composition according to an embodiment of the present invention may comprise other epoxy resins as the epoxy resin (A) in addition to the above-mentioned bisphenol A epoxy resin (A1) and the hydrogenated bisphenol A epoxy resin (A2). For example, according to an embodiment of the present invention, coating compositions may comprise Bisphenol F epoxy resin, novolak epoxy resin, dimer modified epoxy resin, cycloaliphatic epoxy resin, epoxy resins and modified epoxy resins selected from glycidyl esters and epoxy functional acrylics or any combination thereof, but are not particularly limited thereto.

In this case, the content of the additional epoxy resin based on the total weight of the epoxy resin (A) may be 30% by weight or less, preferably 20% by weight or less, more preferably 10% by weight or less based on the total weight of the composition, in consideration of low-temperature curing properties, adhesion to the base or top coat, and economic feasibility, (B) Reactive Diluent The first liquid of the coating composition according to an embodiment of the present invention comprises a reactive diluent (B) as one of the binder resin components. The reactive diluent serves to lower the viscosity of the coating composition and improve atomization.

In an embodiment of the present invention, the reactive diluent may be formed from a modified epoxy compound. Examples of such reactive diluents include phenyl glycidyl ethers, alkyl glycidyl ethers (1 to 16 carbon atoms in the alkyl group), glycidyl esters of versatic acid ($R^1R^2R^3C$—COO-Gly, where R1, $R^2$, $R^3$ is an alkyl group having 8 to 10 carbon atoms, and Gly is a glycidyl group), olefin epoxide ($CH_3$—$(CH_2)_n$-Gly, where n is 11-13); 1,6-hexanediol diglycidyl ether (Gly-O—$(CH_2)_6$—O-Gly), neopentyl glycol diglycidyl ether (Gly-O—$CH_2$—$C(CH_3)_2$—$CH_2$—O-Gly), trimethylolpropane triglycidyl ether ($CH_3$—$CH_2$—C($CH_2$—O-Gly$)_3$) and $C_{1-20}$ alkylphenyl glycidyl ether, but are not particularly limited thereto.

In a preferred embodiment of the present invention, the reactive diluent may comprise an aliphatic reactive diluent such as 1,6-hexanediol diglycidyl ether or 1,4-butanediol diglycidyl ether. These aliphatic reactive diluents can improve the flexibility of coating films.

In a preferred embodiment of the present invention, the reactive diluent may be multifunctional. Compared to the monofunctional reactive diluent, the multifunctional reactive diluent can accelerate the drying process and increase the crosslinking density by participating in the resin network formed during the curing reaction of the coating composition.

The reactive diluents listed above may be used alone or in combination of two or more.

In an embodiment of the present invention, the reactive diluent may have a viscosity of 10 to 50 cP when measured according to ASTM D4285 at a temperature of 23° C. and a relative humidity of 50%. The viscosity of the reactive diluent may be preferably 10 to 40 cP, more preferably 10 to 35 cP.

In an embodiment of the present invention, the coating composition may comprise the reactive diluent (B) in an amount of 2.5 to 20% by weight based on the total weight of the composition. The content of the reactive diluent in the coating composition may be preferably 2.5 to 10% by weight, more preferably 2.5 to 8% by weight, and most preferably 5 to 8% by weight, based on the total weight of the composition. When the content of the reactive diluent in the coating composition is within the above range, the viscosity of the coating composition is lowered to obtain a composition having a high solid content. When the content of the reactive diluent in the coating composition exceeds 20% by weight based on the total weight of the composition, the drying time of the coating composition may be prolonged and heat resistance may be lowered, which is not preferable.

(C) Silane Compound

The first liquid of the coating composition according to the embodiment of the present invention comprises a silane compound (C) as one of the binder resin components. The silane compound serves to lower the viscosity of the coating composition, improve drying properties, and improve rust prevention.

In an embodiment of the present invention, the silane compound may be an epoxy silane containing an epoxy group. Examples of such silane compounds include:

methacryloxypropyltrimethoxysilane (dynasilane MEMO, Silquest A-174NT), 3-mercaptopropyltri(meth)ethoxysilane (dynasilane MTMO or 3201, Silquest A-189), 3-glycidoxypropyltrimethoxysilane (dynasilane GLYMO, Silquest A-187), tris (3-trimethoxysilylpropyl) isocyanurate (Silquest Y-11597), γ-mercaptopropyltrimethoxysilane (Silquest A-189), β-(3,4-epoxycyclohexyl)ethyltrimethoxysilane (Silquest A-186).

γ-isocyanatopropyltrimethoxysilane (Silquest A-Link 35, Genosil GF40), (methacryloxyethyl)trimethoxysilane (Genosyl XL 33), (isocyanatomethyl)trimethylethoxysilane (Genosil XL 43);

aminopropyltrimethoxysilane (dynasilane AMMO, Silquest A-1110), aminopropyltriethoxysilane (dynasilane AMEO) or N-(2-aminoethyl)-3-aminopropyltrimethoxysilane (dynasilane DAMO, Silquest A-1120) or N-(2-aminoethyl)-3-aminopropyltriethoxysilane, triamino-functional trimethoxysilane (Silquest A-1130), bis(γ-trimethoxysilylpropyl)amine (Silquest A-1170), N-ethyl-γ-aminoisobutyltrimethoxysilane (Silquest A-Link 15), N-phenyl-γ-aminopropyltrimethoxysilane (Silquest Y-9669), 4-amino-3,3-dimethylbutyltrimethoxysilane (Silquest Y-11637).

(N-cyclohexylaminomethyl)triethoxysilane (Genosyl XL 926), (N-phenylaminomethyl)trimethoxysilane (Genosyl XL 973), Deolink Epoxy TE and Deolink Amino TE (D.O.G Deutsche Woolfabrik), 3-aminopropyltriethoxysilane, 3-aminopropyltrimethoxysilane, N-(aminoethyl)-aminopropyltrimethoxysilane, 3-aminopropylmethyldiethoxysilane, 3-(2-aminoethyl amino)propyhnethyldimethoxysilane

[3-(2,3-epoxypropoxy)propyl]triethoxysilane, and

[3-(2,3-epoxypropoxy)propyl]trimethoxysilane, but is not particularly limited thereto.

In a preferred embodiment of the present invention, the silane compound may comprise 3-glycidoxypropyltrimethoxysilane.

The silane compounds listed above may be used alone or in combination of two or more.

In an embodiment of the present invention, the silane compound may have a weight average molecular weight of 400 g/mole or less. The weight average molecular weight of the silane compound may be preferably 350 g/mol or less, more preferably 300 g/mol or less.

In an embodiment of the present invention, the coating composition may comprise the silane compound (C) in an amount of 2.5 to 30% by weight based on the total weight of the composition. The content of the silane compound in the coating composition may be preferably 2.5 to 27% by weight, more preferably 2.5 to 25% by weight, and most preferably 5 to 20% by weight, based on the total weight of the composition. When the content of the silane compound in the coating composition is within the above range, the viscosity of the coating composition is lowered to obtain a composition having a high solid content. When the content of the silane compound in the coating composition exceeds 30% by weight based on the total weight of the composition, the pot life of the coating composition may be shortened, which is not preferable.

(D) Amine Curing Agent

The second liquid of the coating composition according to the embodiment of the present invention comprises an amine-based curing agent (D) for curing the binder components of the first liquid.

In an embodiment of the present invention, the amine-based curing agent contains at least two reactive hydrogen atoms linked to nitrogen. Thus, amine-based curing agents may typically be primary or secondary amines. Examples of such amine-based curing agents include aliphatic amines and polyamines (for example, cycloaliphatic amines and polyamines), polyamido amines, polyoxyalkylene amines (for example, polyoxyalkylene diamines), aminated polyalkoxy ethers (such as those sold commercially as Jeffamine), alkylene amines (such as alkylene diamines), aralkyl amines, aromatic amines, Mannich bases (e.g., those sold commercially as “phenalkamines”); amines or amino-functional polymers selected from amino-functional silicones or silanes, epoxy adducts, and derivatives thereof, but are not particularly limited thereto.

Examples of commercially available amine-based curing agents include Cardolite NC-541, Cardolite Light 2001 from Cardanol Chemicals; Sunmid CX-105X from Sanwa Chemical Industry Co., Ltd.; Epicure 3090, Epicure 3140, Epicure 3115X-70 from Resolution Performance Products; SIQ Amine 2015, SIQ Amine 2030 from SIQ Kunstarze GmbH; Polyfox VH 40309/12, Polyfox VH 40294 from Wolf Prümmer Polymer-Chemi GmbH; Ancarmin 2609, Ancarmin 2695, Ancarmin 2738 from Air Products; Adeka Hardner from Adeka Corporation, AP1077 from Admark, Setepox 1490 H from CTP Chemicals and Technologies for Polymers; Epoxy Hardener MXDA from Mitsubishi Gas Chemical Company, Inc.; Gascamine 240, diethylaminopropylamine, isophoronediamine from BASF; Cardolite Light 2002 from Cardanol Chemicals; Aradur 42 BD, Aradur 943 CH from Huntsman Advanced Materials; Cray Amide E260 E90 from Cray Valley, and the like, but are not particularly limited thereto.

The above-listed amine-based curing agents may be used alone or in combination of two or more.

In a preferred embodiment of the present invention, the amine-based curing agent may comprise a phenalkamine or polyamine curing agent. More preferably, the amine-based curing agent may comprise Ancamine 2738 from Air Products. Ancamine 2738 from Air Products can provide a sufficient curing rate of the coating composition above ambient temperature without the need for curing accelerators such as tertiary amines used in conventional coating compositions to improve pot life or water resistance.

In an embodiment of the present invention, the amine-based curing agent may have a viscosity of 50 to 500 cP when measured according to ASTM D4285 at a temperature of 23° C. and a relative humidity of 50%. The viscosity of the amine-based curing agent may be preferably 50 to 300 cP, more preferably 50 to 200 cP.

In an embodiment of the present invention, the amine-based curing agent may have an active hydrogen equivalent weight (AHEW) in the range of 30 to 150 g/eq. The active hydrogen equivalent of the amine-based curing agent may be preferably 50 to 100 g/eq., more preferably 75 to 100 g/eq.

In an embodiment of the present invention, the content of the curing agent in the coating composition may be selected such that the ratio of active hydrogen equivalents in the curing agent to epoxy equivalents in the first liquid is in the range of 50:100 to 100:100. The ratio of active hydrogen equivalents to epoxy equivalents of the coating composition may preferably be from 55:100 to 95:100, more preferably from 60:100 to 90:100. When the content of the amine-based curing agent in the coating composition is selected such that the ratio of active hydrogen equivalent to epoxy equivalent of the coating composition satisfies the above range, a coating composition having optimal physical properties can be obtained.

Here, the active hydrogen equivalent of the amine-based curing agent is the total value obtained by dividing the molecular weight of each amine-based curing agent (D) comprised in the second liquid of the coating composition by the number of active hydrogens capable of reacting with the epoxy group.

The epoxy equivalent of the coating composition is the total of the molecular weight of each of the epoxy group-containing binder components such as the epoxy resin (A), the reactive diluent (B) and the silane compound (C) divided by the number of epoxy groups.

Additional Components of the Coating Composition (E) Pigment

The first liquid in the coating composition according to an embodiment of the present invention may further comprise a pigment (E). Specifically, the pigment (E) may comprise a color pigment (E1) and an extender pigment (E2). If necessary, the pigment (E) may further comprise a rust-preventive pigment (E3).

The color pigment (E1) has hiding power and coloring power; examples of colored pigments include titanium oxide, carbon black, lead white, graphite, zinc sulfide, zinc oxide, chromium oxide, yellow nickel titanium, yellow chrome titanium, yellow iron oxide, red iron oxide, black iron oxide, phthalocyanine blue, phthalocyanine green, ultramarine blue, benzimidazolone yellow, quinacridone red, azo red/yellow pigments, and the like, but are not particularly limited thereto. Preferred colored pigments may comprise titanium oxide or carbon black.

The color pigments listed above may be used alone or in combination of two or more.

In an embodiment of the present invention, the coating composition may comprise the color pigment (E1) in an amount of 0.1 to 25% by weight based on the total weight of the composition. The content of the color pigment in the coating composition may be preferably 5 to 25% by weight, more preferably 5 to 12% by weight, based on the total weight of the composition.

The extender pigment (E2) has no hiding power or coloring power, but can improve the mechanical properties of the coating film. Examples of extender pigments include talc, clay, calcium carbonate, magnesium carbonate, barium sulfate, silicic acid, silicates, alumina, calcium sulfate, mica iron oxide (MIO), glass flakes, mica, and the like, but are not particularly limited. Preferred extender pigments may comprise barium sulfate or mica.

The extender pigments listed above may be used alone or in combination of two or more.

In an embodiment of the present invention, the coating composition may comprise the extender pigment (E2) in an amount of 25 to 60% by weight based on the total weight of the composition. The content of the extender pigment in the coating composition may be preferably 30 to 60% by weight, more preferably 30 to 50% by weight, based on the total weight of the composition.

The rust-preventive pigment (E3) is able to improve the rust-preventive properties of the coating film; examples of rust-preventive pigments include zinc molybdate, aluminum molybdate, lead cyanamide, lead, lead suboxide, zinc chromate, zinc powder, zinc oxide, basic lead chromate, basic lead sulfate, calcium leadate, aluminum tripolyphosphate, zinc phosphate, calcium phosphate, aluminum powder, hemihydrate gypsum and the like, but are not particularly limited thereto.

The rust-preventive pigments listed above may be used alone or in combination of two or more.

In an embodiment of the present invention, the pigment (E) may be comprised in the first liquid of the coating composition.

(F) Anti-Settling Agent

The first liquid in the coating composition according to an embodiment of the present invention may further comprise an anti-settling agent (F). The antisettling agent (F) serves to improve the rheological properties of the coating composition.

Antisettling agents may include thixotropic agents such as polyamide waxes, polyethylene waxes or bentonite-based thixotropic agents. Specific examples of such anti-settling agents include Craivalak Ultra, Cravalak LV from Arkema; Tixatrol ST, Tixatrol Max from Elementis; and Dispalon 6650 from Kusumoto Chemicals Limited, but are not particularly limited thereto. Preferred antisettling agents may include polyamide waxes.

The above-listed anti-settling agents may be used alone or in combination of two or more.

In an embodiment of the present invention, the coating composition may include an anti-settling agent (E) in an amount of 0.1 to 5% by weight based on the total weight of the composition. The content of the antisettling agent in the coating composition may be preferably 0.5 to 5% by weight, more preferably 0.7 to 5% by weight, based on the total weight of the composition.

(G) Solvent

Considering the object of the present invention to provide a coating composition containing no solvent or a low content of solvent, it is preferable that the coating composition does not contain a solvent. If the coating composition according to an embodiment of the present invention comprises a solvent, the content thereof is preferably 4% by weight or less based on the total weight of the composition. More preferably, the content of the solvent in the coating composition may be 3% by weight or less, 2% by weight or less, or 1% by weight or less based on the total weight of the composition. At this time, the solvent may be comprised in the first liquid of the coating composition.

In a specific embodiment of the present invention, the above solvent is commonly used in the art pertaining to the present invention, and examples thereof include toluene, xylene, isobutanol, methyl ethyl ketone, methyl isobutyl ketone, and benzyl alcohol, but are not particularly limited thereto. A preferred solvent may be benzyl alcohol. Since benzyl alcohol has a boiling point of 205° C., it remains on the coating film of the room temperature drying type of coating composition. Benzyl alcohol can improve the speed of the crosslinking reaction between the epoxy resin and the amine-based curing agent while serving to lower the viscosity of the coating composition.

The solvents listed above may be used alone or in combination of two or more.

The coating composition according to the embodiment of the present invention may further comprise other components than the components listed above. Examples of these additional ingredients include thermoplastic resins, color separation inhibitors, antifoaming agents, film formation aids, ultraviolet absorbers, antioxidants, leveling agents, gloss removers, hardening accelerators, dispersants, viscosity modifiers, surface conditioners, plasticizers, preservatives, reactive diluents, non-reactive diluents, and the like, but are not particularly limited thereto.

Characteristics of the Coating Composition

The coating composition according to one embodiment of the present invention may be prepared through a method for preparing a general coating composition using an epoxy resin.

Since the coating composition according to a preferred embodiment of the present invention is a two-component type including a first liquid and a second liquid, a first liquid containing an epoxy resin, a reactive diluent and a silane compound, and a second liquid containing an amine-based curing agent may be prepared, respectively. The first liquid and the second liquid may be mixed with each other immediately before use.

Therefore, according to one embodiment of the present invention, a coating composition is provided, comprising: (A) an epoxy resin comprising (A1) 5 to 25% by weight of a bisphenol A epoxy resin and (A2) 5 to 50% by weight of a hydrogenated bisphenol A epoxy resin; (B) 2.5-10% by weight of a reactive diluent; (C) 2.5 to 17% by weight of a silane compound; (D) an amine-based curing agent; (E) a pigment comprising (E1) 0.1 to 25% by weight of a color pigment and (E2) 25 to 60% by weight of an extender pigment; (F) 0.1-5% by weight of an anti-settling agent; and (G) 0-4% by weight of a solvent, based on the total weight of the composition; wherein the coating composition has a solids content of at least 90% by weight when measured according to ASTM D5201-05; has a viscosity of 60 to 110 KU (Krebs) when measured according to ASTM D562-10 at a temperature of 23° C. and a relative humidity of 50%; the ratio of active hydrogen equivalents in the curing agent to epoxy equivalents in the coating composition ranges from 50:100 to 100:100; and the weight ratio of the bisphenol A epoxy resin (A1) to the hydrogenated bisphenol A epoxy resin (A2) ranges from 60:40 to 25:75.

Here, specific details regarding the (A) epoxy resin, (B) reactive diluent, (C) silane compound, and (D) amine-based curing agent; (E) pigment, (F) anti-settling agent, and (G) solvent are as described above.

In an embodiment of the present invention, the coating composition has a solids content of at least 90% by weight when measured according to ASTM D5201-05. The solids content of the coating composition may be preferably 95% by weight or higher, more preferably 97% by weight or higher, and most preferably 99% by weight or higher.

As such, the coating composition according to the embodiment of the present invention exhibits a high solid content; therefore, in an embodiment of the present invention, the coating composition may have a VOC content of 100 g/liter or less when measured according to ASTM D5201-05. The VOC content of the coating composition may preferably be 80 g/liter or less, more preferably 70 g/liter or less, and most preferably 50 g/liter or less.

In an embodiment of the present invention, the coating composition has a viscosity of 60 to 110 KU (Krebs) when measured according to ASTM D562-10 at a temperature of 23° C. and a relative humidity of 50%. The viscosity of the coating composition may be preferably 65 to 105 KU, more preferably 70 to 100 KU. As such, since the coating composition according to the embodiment of the present invention exhibits low viscosity, it can exhibit excellent pot life and atomization degree when applied with an airless sprayer.

In an embodiment of the present invention, the coating composition may have a pot life of 1 hour or more. The pot life of the coating composition may be preferably 1.2 to 2 hours, more preferably 1.5 to 2 hours. Here, "pot life" refers to the time after mixing of the first and second liquids, which allows the coating composition to be applied to the substrate by means of an airless sprayer. If the coating composition cures too quickly, the coating composition has a very short pot life. Pot life of less than 30 minutes is commercially challenging, given the time it takes to coat large objects such as ship blocks and the volume supplied to the spray gun.

In an embodiment of the present invention, the coating composition has a ratio of active hydrogen equivalents in the curing agent to epoxy equivalents in the coating composition in the range of 50:100 to 100:100. The ratio of active hydrogen equivalents to epoxy equivalents of the coating composition may preferably be from 55:100 to 95:100, more preferably from 60:100 to 90:100.

Here, the active hydrogen equivalent of the amine-based curing agent is the total value obtained by dividing the molecular weight of each amine-based curing agent (D) comprised in the second liquid of the coating composition by the number of active hydrogens capable of reacting with the epoxy group.

The epoxy equivalent of the coating composition is the total of the molecular weight of each of the epoxy group-containing binder components such as the epoxy resin (A), the reactive diluent (B) and the silane compound (C) divided by the number of epoxy groups.

The coating composition according to an embodiment of the present invention can be cured on a substrate to provide a corrosion-resistant primer coating layer. There is no particular limitation on the method of applying the coating composition according to the embodiment of the present invention to the substrate, and general methods such as brush, roller, and spray may be used. In an embodiment of the present invention, the coating composition may be applied to a substrate by means of an airless sprayer.

Application of the coating composition is made within pot life after mixing of the first and second liquids. Since the coating composition according to the embodiment of the present invention has a long pot life, painting workability can be improved.

The applied coating composition may form a coating film through drying. The drying temperature is usually room temperature (about 20 to 35° C.), but it is also possible to perform drying at a temperature lower than this. In an embodiment of the present invention, the coating composition may have a drying time of 8 to 12 hours or more based on a 25° C. standard when measured according to ASTM D5895 based on a coating film thickness of 300 μm. The drying time of the coating composition may be preferably 8.5 to 11.5 hours, more preferably 9 to 11 hours. If the drying time exceeds 12 hours, the time taken to complete the coating on a large object such as a ship block is too long and the work efficiency deteriorates.

The coating film formed from the coating composition typically has a thickness of 100 to 500 μm, such as 150 to 350 μm. The thickness of the coating film may vary depending on the characteristics of the substrate to be coated and expected exposure conditions.

The coating film formed from the coating composition undergoes a curing process. The coating film may cure spontaneously. Although irradiation and heat may be used to promote cure, the compositions of the present invention may be cured at ambient temperature without such means.

Although the coating composition according to embodiments of the present invention is preferably applied as a single coating, in embodiments of the present invention, additional coatings may be formed while the coating film formed from the coating composition is in a wet state.

According to another embodiment of the present invention, a substrate coated with at least a portion of the above coating composition is provided.

In one embodiment of the present invention, the substrate may comprise at least one of steel, stainless steel, carbon steel, galvanized steel, shop primer steel, and aluminum, but is not particularly limited thereto.

MODE FOR CARRYING OUT THE INVENTION

Embodiments

Hereinafter, the present invention will be described in more detail through Embodiments and Comparative Examples. However, the following examples are only for illustrating the present invention, and the scope of the present invention is not limited only thereto.

Components used in Embodiments and Comparative Examples are as follows.

- Bisphenol A epoxy resin: EEW 190 g/eq., 23° C. viscosity 18,000 cP
- Hydrogenated bisphenol A epoxy resin: EEW 215 g/eq., 23° C. viscosity 3,490 cP
- Bisphenol F epoxy resin: EEW 170 g/eq., 23° C. viscosity 3,500 cP
- Reactive diluent: 1,6-hexanediol diglycidyl ether, EEW 149 g/eq.; 23° C. Viscosity 25 cP
- Silane compound: EEW 236 g/eq.
- Amine-based curing agent: AHEW 95 g/eq., 23° C. viscosity 142 cP
- Color Pigment: Titanium dioxide
- Extender Pigment: Barium Sulfate
- Antisettling agent: polyamide wax
- Organic solvent: benzyl alcohol

Preparation Example 1

Binder resins and compounds of the same types and contents (unit; parts by weight) as shown in Table 1 below were mixed. Specifically, the first liquid was prepared by dispersing the pigment using a high-speed dispersing machine, activating the anti-settling agent (viscosifier) by raising the temperature, and then mixing the remaining raw materials. Then, a coating composition was prepared by sufficiently stirring and mixing the first liquid and the second liquid with a stirrer until they became homogeneous. The ratios of active hydrogen equivalent to epoxy equivalent in the compositions of Embodiments and Comparative Examples below were all 89:100.

TABLE 1

| Component | | Embodiment 1 | Comparative Example 1 | Comparative Example 2 | Comparative Example 3 | Comparative Example 4 |
|---|---|---|---|---|---|---|
| First liquid | Bisphenol A epoxy resin | 13.0 | 12.7 | 25.7 | — | — |
| | Hydrogenated bisphenol A epoxy resin | 13.0 | — | — | 26.1 | — |
| | Bisphenol Fepoxy resin | — | 12.7 | — | — | 25.1 |
| | Reactive diluent | 5.3 | 5 3 | 5.3 | 5.3 | 5 3 |
| | Silane compound | 6.9 | 6.9 | 6.9 | 6.9 | 6.9 |
| | Color pigment | 3.7 | 3.7 | 3.7 | 3.7 | 3.6 |
| | Extender pigment | 38.5 | 38.1 | 38.3 | 38.9 | 38.1 |
| | Antisettling agent | 1.5 | 1.5 | 1.5 | 1.5 | 1.5 |
| | Organic solvent | 1.6 | 1.6 | 1.7 | 1.8 | 1.6 |
| Second liquid | Amine curing agent | 16.5 | 17.5 | 16.9 | 15.8 | 17.9 |
| Total | | 100.0 | 100.0 | 100.0 | 100.0 | 100.0 |

Experimental Example 1

The compositions obtained in the above Embodiments and Comparative Examples were tested in the following manner. The results are shown in Table 2 below.

(1) Solid Content

Solids content in the composition was determined according to ASTM D5201-05.

(2) Viscosity

The viscosity of the composition when measured according to ASTM D562-10 at a temperature of 23° C. and a relative humidity of 50%. The viscosity of the binder resin and the amine-based curing agent when measured according to ASTM D4285 at a temperature of 23° C. and a relative humidity of 50%.

(3) VOC (Volatile Organic Compounds)

The VOC of the composition when measured according to ASTM D5201-05.

(4) Pot Life

At 23° C., the first and second liquids were mixed by filling a 0.5 liter steel can up to at least ⅔ full. Immediately after mixing, the viscosity of the mixture when measured every 10 minutes using a Krebs Units Viscometer according to ASTM D562. The time when the viscosity of the mixture rose by 50% compared to the initial viscosity was adopted as the pot life.

(5) Drying Time

Measurements were made at 25° C. according to ASTM D5895 using a Beck and Koller dry time meter.

(6) Anti-Corrosive Property

Referring to FIG. 1, a steel specimen 10 having a width of 15 cm, a length of 15 cm, and a thickness of 3 mm was prepared and subjected to blasting according to ISO 8501-1. Thereafter, the coating composition was applied to a steel specimen to a thickness of about 320 μm by airless spray. The coating film was dried at room temperature for 5 days, and a zinc anode 20 was attached at a distance of about 2 cm from one end of the steel specimen. Using a knife having a thickness of 1 mm, a groove 30 with a length of 5 cm was made in the center of the specimen so that the iron plate was clearly exposed. After immersing the steel specimen in seawater for 6 months, the degree of delamination when measured according to ISO 4628-8. That is, the length at which the coating film was peeled off around the groove when measured.

(7) Workability

Using an airless spray, the degree of tailing was observed while spraying the coating composition under the conditions of a temperature of 23±2° C., airless pump compression ratio of 73:1, air pressure of 4-5 bar, spray tip size of 521, a tip filter of 80 mesh and a spray hose length of 30 m (see FIG. 2); when the coating composition was sprayed in a fan shape and there was no tailing, it was evaluated as 5, when slight tailing was present, 4, when tailing was present, 3, when tailing was severe, 2, and when the coating composition was sprayed in a line, it was evaluated as 1 (see FIG. 2).

(8) Recoatability

A steel specimen having a width of 30 cm, a length of 10 cm and a thickness of 1.6 mm was prepared and blasted according to ISO 8501-1. The coating composition was applied to the specimen with an airless spray to a thickness of about 160 μm. The coated specimens were placed outdoors and subjected to secondary coating with the same coating composition and commercialized paints (SIGMACOVER456 SIGMADUR 550 and PSX 700) at different times. After immersing the secondary coated specimen in seawater for 1 month, the degree of adhesion between the paint layers before and after immersion when measured according to ASTM D 3359. If there was no adhesion defect, it is indicated as ○, if there was adhesion defect, Δ, and if adhesion defect was severe, it is marked as x (see Table 3).

TABLE 2

| | Embodiment 1 | Comparative Example 1 | Comparative Example 2 | Comparative Example 3 | Comparative Example 4 |
|---|---|---|---|---|---|
| Solid content (% by weight) | 93.8 | 95.4 | 95.8 | 93.3 | 97.1 |
| Viscosity (KU) | 98.5 | 97.0 | 109.0 | 94.8 | 95.2 |
| VOC (g/liter) | 65 | 52.7 | 44.5 | 67.8 | 53.7 |

TABLE 2-continued

| | Embodiment 1 | Comparative Example 1 | Comparative Example 2 | Comparative Example 3 | Comparative Example 4 |
|---|---|---|---|---|---|
| Pot life (25° C.) | 1 h 40m | 54 m | 1 h 3 m | 2 hrs 36 m | 56 m |
| Drying time (25° C.) | 11 hrs | 9.2 hrs | 9 hrs | 16 hrs | 9 hrs |
| Coating thickness (μm) | 300 | 300 | 300 | 300 | 300 |
| Anti-rust (mm) | 1~2 | 3~4.5 | 2~5.5 | 2~2.5 | 1.5~7.5 |
| Workability | 4.5 | 4.5 | 3 | 4.5 | 4.5 |

TABLE 3

| | | Embodiment 1 | Comparative Example 1 | Comparative Example 2 | Comparative Example 3 | Comparative Example 4 |
|---|---|---|---|---|---|---|
| Same composition (about 160 μm) | 1D | ○/○ | ○/○ | ○/○ | ○/○ | ○/○ |
| | 3D | ○/○ | ○/○ | ○/○ | ○/○ | ○/○ |
| | 7D | ○/○ | ○/○ | ○/○ | ○/○ | ○/○ |
| | 2W | ○/○ | ○/○ | ○/○ | ○/○ | ○/○ |
| | 3W | ○/○ | ○/○ | ○/○ | ○/○ | ○/○ |
| | 4W | ○/○ | x/x | ○/○ | ○/○ | x/x |
| SIGMACOVER 456 (about 100 μm) | 1D | ○/○ | ○/○ | ○/○ | ○/○ | ○/○ |
| | 3D | ○/○ | ○/○ | ○/○ | ○/○ | ○/○ |
| | 7D | ○/○ | ○/○ | ○/○ | ○/○ | ○/○ |
| | 2W | ○/○ | ○/○ | ○/○ | ○/○ | ○/○ |
| | 3W | ○/○ | ○/○ | ○/○ | ○/○ | ○/○ |
| | 4W | ○/○ | ○/x | ○/x | ○/○ | ○/x |
| SIGMADUR 550 (about 50 μm) | 1D | ○/○ | ○/○ | ○/○ | ○/○ | ○/○ |
| | 3D | ○/○ | ○/○ | ○/○ | ○/○ | ○/○ |
| | 7D | Δ/○ | ○/x | ○/○ | ○/○ | ○/x |
| | 2W | Δ/○ | ○/x | ○/x | ○/○ | ○/x |
| | 3W | ○/○ | ○/x | ○/○ | ○/○ | ○/x |
| | 4W | x/x | x/x | x/x | Δ/x | x/x |

TABLE 3-continued

| | | Embodiment 1 | Comparative Example 1 | Comparative Example 2 | Comparative Example 3 | Comparative Example 4 |
|---|---|---|---|---|---|---|
| PSX 700 (about 70 μm) | 1D | ○/○ | ○/○ | ○/○ | ○/○ | ○/○ |
| | 3D | ○/○ | ○/○ | ○/○ | ○/○ | ○/○ |
| | 7D | ○/○ | ○/○ | ○/○ | ○/○ | ○/○ |
| | 2W | ○/○ | ○/○ | ○/○ | ○/○ | ○/○ |
| | 3W | ○/○ | ○/○ | ○/○ | ○/○ | ○/○ |
| | 4W | ○/○ | x/x | ○/○ | ○/○ | x/x |

As can be seen from Tables 2-3 above, the coating composition of Embodiment 1, which is within the scope of the present invention, had an appropriate viscosity, pot life and drying time, and was excellent in rust prevention and repaintability, despite a high solid content.

On the other hand, the coating compositions of Comparative Example 1 and Comparative Example 4 had a short pot life, and were relatively poor in rust prevention and repaintability. The coating composition of Comparative Example 2 had relatively poor rust prevention and work-ability, and the coating composition of Comparative Example 3 had too long drying time.

Preparation Example 2

Coating compositions were prepared by varying the weight ratio of bisphenol A epoxy resin and hydrogenated bisphenol A epoxy resin as shown in Table 4 below. The ratios of active hydrogen equivalent to epoxy equivalent in the compositions of Examples and Comparative Examples below were all 89:100.

TABLE 4

| | | Embodiment 1 | Embodiment 2 | Embodiment 3 | Embodiment 4 | Comparative Example 5 |
|---|---|---|---|---|---|---|
| First liquid | Weight ratio of bisphenol A epoxy resin to hydrogenated bisphenol | 50:50 | 60:40 | 40:60 | 30:70 | 70.30 |
| | Bisphenol A epoxy resin | 13.0 | 15.5 | 10.4 | 7.8 | 18.0 |
| | Hydrogenated bisphenol A epoxy resin | 13.0 | 10.3 | 15.5 | 18.2 | 7.7 |

TABLE 4-continued

| | | Embodiment 1 | Embodiment 2 | Embodiment 3 | Embodiment 4 | Comparative Example 5 |
|---|---|---|---|---|---|---|
| | Reactive diluent | 5.3 | 5.3 | 5.3 | 5.3 | 5.3 |
| | Silane compound | 6.9 | 6.9 | 6.9 | 6.9 | 6.9 |
| | Coloring pigment | 3.7 | 3.7 | 3.7 | 3.7 | 3.7 |
| | Body pigment | 38.5 | 38.5 | 38.6 | .38.7 | 38.7 |
| | Anti-settling agent | 1.5 | 1.5 | 1.5 | 1.5 | 1.5 |
| | Organic compound | 1.6 | 1.8 | 1.8 | 1.8 | 1.6 |
| Second liquid | Amine-based curing agent | 16.5 | 16.5 | 16.3 | 16.1 | 16.6 |
| Total | | 100.0 | 100.0 | 100.0 | 100.0 | 100.0 |

Experimental Example 2

The viscosity, pot life, drying time, rust prevention and workability (see FIG. 3) of the compositions obtained in the Embodiments and Comparative Example of Table 4 were measured in the same manner as in Experimental Example 1 above. The results are shown in Table 5 below.

TABLE 5

| | Embodiment 1 | Embodiment 7 | Embodiment 3 | Embodiment 4 | Comparative Example 5 |
|---|---|---|---|---|---|
| Viscosity (KU) | 98.5 | 101 | 98.0 | 97.0 | 104 |
| Pot life (25° C.) | 1 h 40 m | 1 h 26 m | 1 h 37 m | 1 h 46 m | 1 h 6 m |
| Drying time (25° C.) | 11 hrs | 10.5 hrs | 11.5 hrs | 14 hrs | 10 hrs |
| Coating thickness (μm) | 300 | 300 | 300 | 300 | 300 |
| Anti-rust (mm) | 1~2 | 2~3 | 2~3 | 2.5~4 | 3~4 |
| Workability | 4.5 | 4 | 4.5 | 4.5 | 3.5 |

As can be seen from Tables 4-5 above, the coating compositions of Embodiments 1 to 4, which belong to the scope of the present invention, had appropriate viscosity, pot life and drying time, and were excellent in rust prevention and workability despite the high solid content.

On the other hand, the coating composition of Comparative Example 5 had relatively poor workability.

INDUSTRIAL APPLICABILITY

The coating composition according to the embodiments falling within the scope of the present invention had appropriate viscosity, pot life and drying time despite high solid content, as well as excellent rust prevention, workability, and repaintability; therefore, it can be usefully used as an anticorrosive paint for the ballast tanks of ships. In addition, this coating composition is environmentally friendly because of its low VOC emissions.

The invention claimed is:

1. A coating composition comprising:

a first liquid that comprises (A) an epoxy resin comprising (A1) a bisphenol A epoxy resin and (A2) a hydrogenated bisphenol A epoxy resin, wherein the composition is free of a bisphenol F epoxy resin;

(B) a reactive diluent; and (C) a silane compound; and a second liquid that comprises (D) an amine-based curing agent;

(E) a pigment comprising (E1) 0.1 to 25% by weight of a color pigment and (E2) 25 to 60% by weight of an extender pigment, based on the total weight of the composition; wherein:

the coating composition has a solids content of 90% or more by weight when measured according to ASTM D5201-05;

has a viscosity of 60 to 110 KU (Krebs) when measured according to ASTM D562-10 at a temperature of 23° C. and a relative humidity of 50%;

the ratio of the active hydrogen equivalent in the curing agent to the epoxy equivalent in the first liquid ranges from 50:100 to 100:100; and the weight ratio of bisphenol A epoxy resin (A1) to hydrogenated bisphenol A epoxy resin (A2) ranges from 60:40 to 25:75.

2. The coating composition according to claim 1, comprising 5 to 35% by weight of a bisphenol A epoxy resin (A1), 5 to 65% by weight of a hydrogenated bisphenol A epoxy resin (A2), 2.5 to 20% by weight of a reactive diluent (B) and 2.5 to 30% by weight of a silane compound (C), based on the total weight of the composition.

3. The coating composition according to claim 1, further comprising (F) 0.1 to 5% by weight of an anti-settling agent, based on the total weight of the composition.

4. The coating composition according to claim 1, further comprising (G) 4% by weight or less of a solvent, based on the total weight of the composition.

5. The coating composition according to claim 1, wherein the epoxy equivalent weight (EEW) of the bisphenol A epoxy resin (A1) ranges from 100 to 300 g/eq.

6. The coating composition according to claim 1, wherein, when measured according to ASTM D4285 at a temperature of 23° C. and a relative humidity of 50%, the viscosity of the bisphenol A epoxy resin (A1) is 7,000 to 30,000 cP.

7. The coating composition according to claim 1, wherein the epoxy equivalent of the hydrogenated bisphenol A epoxy resin (A2) ranges from 100 to 300 g/eq.

8. The coating composition according to claim 1, wherein, when measured according to ASTM D4285 at a temperature of 23° C. and a relative humidity of 50%, the viscosity of the hydrogenated bisphenol A epoxy resin (A2) is 1,000 to 7,000 cP.

9. The coating composition according to claim 1, wherein the reactive diluent (B) comprises 1,6-hexanediol diglycidyl ether or 1,4-butanediol diglycidyl ether.

10. The coating composition according to claim 1, wherein the viscosity of the reactive diluent (B) is 10 to 50 cP when measured according to ASTM D4285 at a temperature of 23° C. and a relative humidity of 50%.

11. The coating composition according to claim 1, wherein the silane compound (C) comprises 3-glycidoxypropyltrimethoxysilane.

12. The coating composition according to claim 1, wherein the amine-based curing agent (D) comprises a phenalkamine or a polyamine curing agent.

13. The coating composition according to claim 1, wherein the viscosity of the amine-based curing agent (D) is 50 to 500 cP when measured according to ASTM D4285 at a temperature of 23° C. and a relative humidity of 50%.

14. The coating composition according to claim 1, wherein the active hydrogen equivalent weight (AHEW) of the amine-based curing agent (D) is in the range of 30 to 150 g/eq.

15. The coating composition according to claim 1, wherein the color pigment (E1) comprises at least one of titanium oxide, carbon black, lead white, graphite, zinc sulfide, zinc oxide, chromium oxide, yellow nickel titanium, yellow chrome titanium, yellow iron oxide, red iron oxide, black iron oxide, phthalocyanine blue, phthalocyanine green, ultramarine blue, benzimidazolone yellow, and quinacridone red and azo red/yellow pigments.

16. The coating composition according to claim 1, wherein the extender pigment (E2) comprises at least one of talc, clay, calcium carbonate, magnesium carbonate, barium sulfate, silicic acid, silicates, alumina, calcium sulfate, mica iron oxide (MIO), glass flakes and mica.

17. The coating composition according to claim 3, wherein the anti-settling agent (F) comprises at least one of polyamide wax, polyethylene wax, and bentonite-based thixotropic agent.

18. The coating composition according to claim 4, wherein the solvent comprises at least one of toluene, xylene, isobutanol, methyl ethyl ketone, methyl isobutyl ketone, and benzyl alcohol.

19. The coating composition according to claim 1, wherein, when measured according to ASTM D562, the coating composition has a pot life of at least 1 hour, defined as the time it takes for the viscosity of the coating composition to increase by 50%; and when measured according to ASTM D5895, the drying time (based on the thickness of the coating film of 300 μm) at 25° C. is 8 to 12 hours.

20. The coating composition according to claim 1, wherein, when measured according to ASTM D5201-05, the coating composition may have a VOC content of 100 g/liter or less.

21. A coating composition, comprising:

(A) an epoxy resin comprising (A1) 5 to 25% by weight of a bisphenol A epoxy resin and (A2) 5 to 50% by weight of a hydrogenated bisphenol A epoxy resin, wherein the composition is free of a bisphenol F epoxy resin, (B) 2.5-10% by weight of a reactive diluent, (C) 2.5 to 17% by weight of a silane compound, (D) an amine-based curing agent, (E) a pigment comprising (E1) 0.1 to 25% by weight of a color pigment and (E2) 25 to 60% by weight of an extender pigment, (F) 0.1-5% by weight of an anti-settling agent, and (G) 0-4% by weight of a solvent, based on the total weight of the composition;

wherein;

the coating composition has a solids content of at least 90% by weight when measured according to ASTM D5201-05;

the coating composition has a viscosity of 60 to 110 KU (Krebs) when measured according to ASTM D562-10 at a temperature of 23° C. and a relative humidity of 50%;

the ratios of active hydrogen equivalents in the curing agent to epoxy equivalents in the coating composition range from 50:100 to 100:100; and the weight ratio of the bisphenol A epoxy resin (A1) to the hydrogenated bisphenol A epoxy resin (A2) ranges from 60:40 to 25:75.

* * * * *